(No Model.)

C. A. DAM.
COTTON SPINNING MULE.

No. 478,738. Patented July 12, 1892.

2 Sheets—Sheet 1.

WITNESSES:
H. A. Hall.
A. D. Hanson.

INVENTOR:
Chas. A. Dam.
by
Wright, Brown & Crossley
Solicitors.

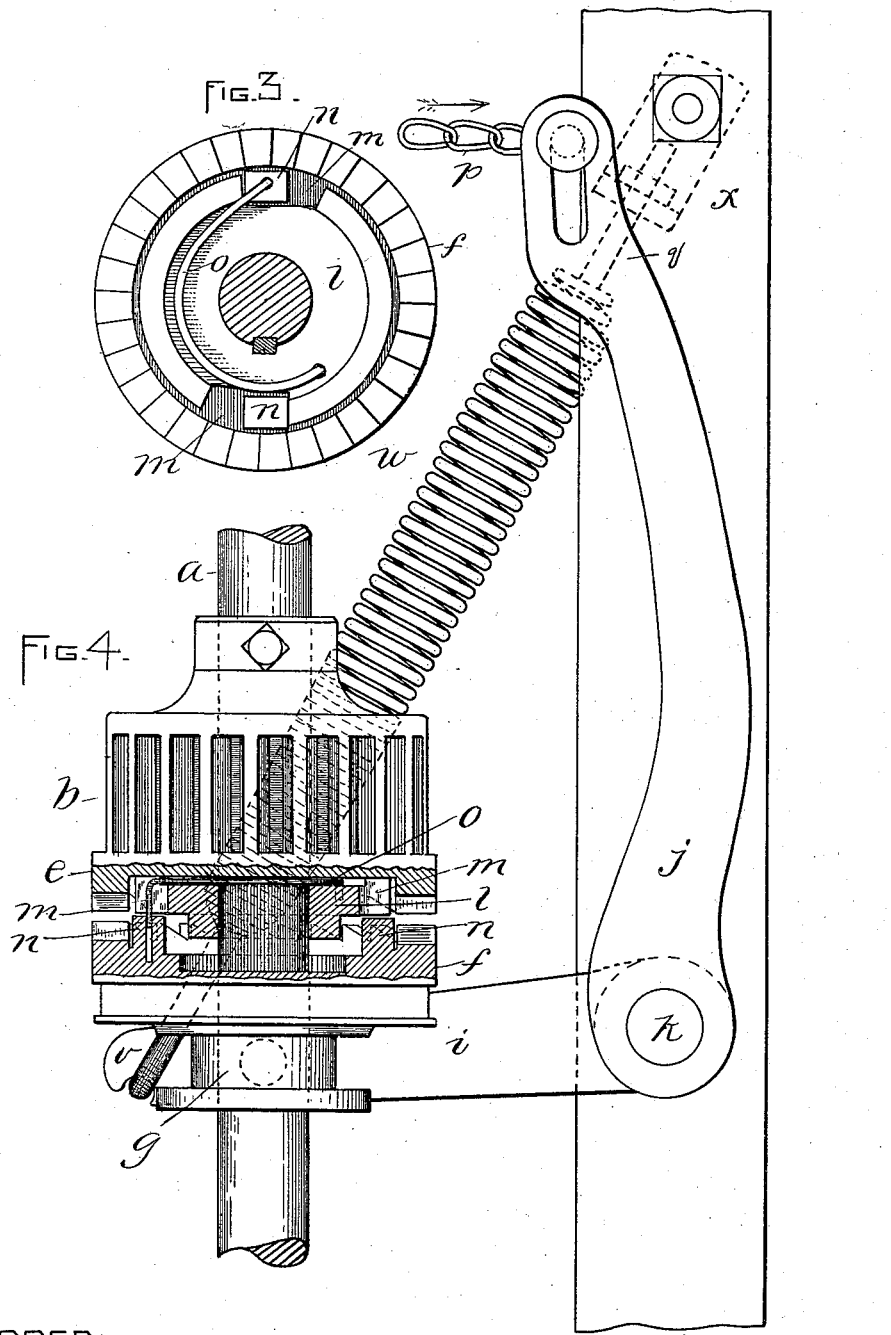

UNITED STATES PATENT OFFICE.

CHARLES A. DAM, OF LOWELL, MASSACHUSETTS.

COTTON-SPINNING MULE.

SPECIFICATION forming part of Letters Patent No. 478,738, dated July 12, 1892.

Application filed November 16, 1891. Serial No. 411,999. (No model.)

*To all whom it may concern:*

Be it known that I, CHARLES A. DAM, of Lowell, in the county of Middlesex and State of Massachusetts, have invented certain new and useful Improvements in Cotton-Spinning Mules, of which the following is a specification.

My invention has relation to "winding motions," so called, for cotton-spinning mules in which a clutch-box is used in place of a ratchet gear and click, as is exemplified in the patent granted to Conley and Andrews, dated November 12, 1889, No. 415,025.

In the operation of the winding motion shown and described in said patent difficulties and objections were met with, among which was the fact that the sliding clutch part was sometimes in such position when "out" that in moving it into engagement with the fixed clutch part the teeth of one part would strike upon those of the other, and there being no provision for "backlash" of either part the teeth were damaged or broken. Again, as the position of the follower-leg varied with reference to the position of the lever for operating the clutch between the beginning of a new cop and its completion, it sometimes happened that the said lever would be moved through its positive connections so as to throw the clutch in before the proper time. By my improvements the difficulties and objections mentioned are overcome.

My invention consists in, first, providing means for circumferentially moving the sliding clutch part to such an extent and holding it in such position with respect to the fixed part as to allow for backlash to a degree sufficient to lock the parts and avoid injury to the teeth, and, second, providing means for moving the clutch, as is hereinafter described and claimed.

Reference is to be had to the annexed drawings and to the letters marked thereon, forming a part of this specification, said letters designating the same parts or features, as the case may be, wherever they occur.

Figure 1:
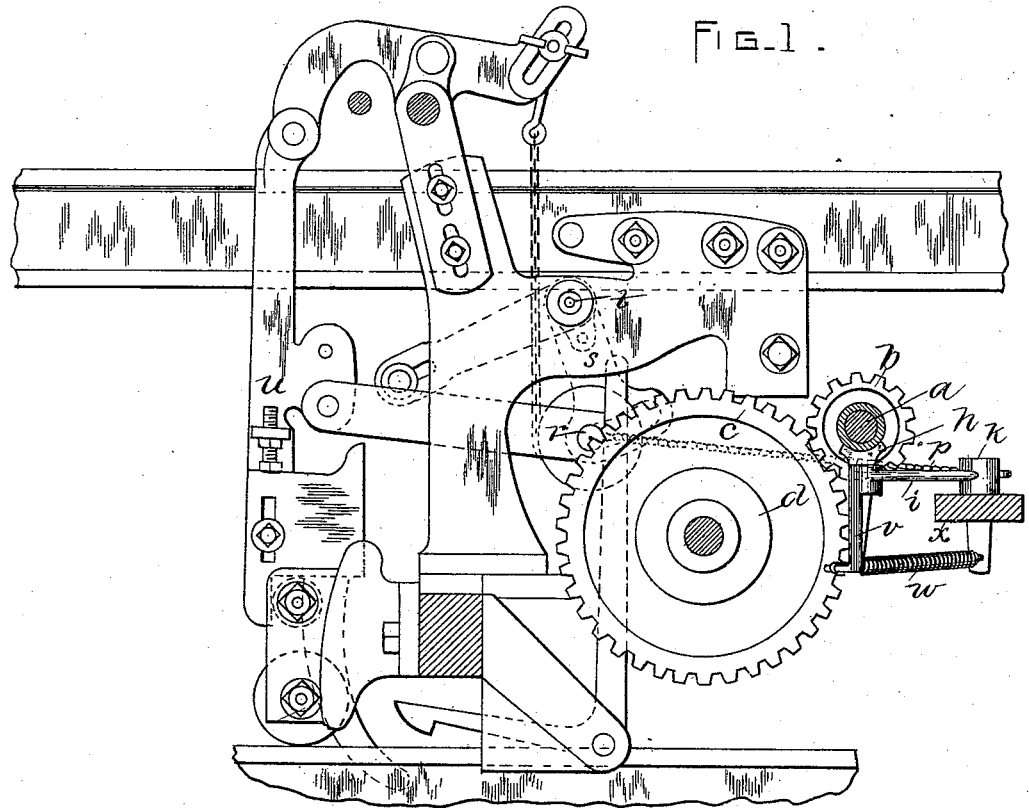
Figure 2:
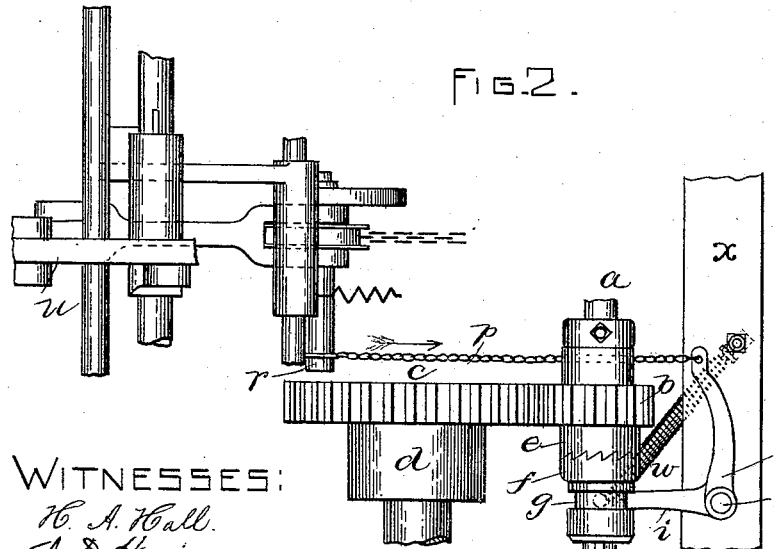

In the drawings, Figure 1 represents a side elevation, partly in section, of so much of a mule-head as it is necessary to show in order to explain the nature and purpose of my improvements. Fig. 2 is a detail plan view of the parts upon which my improvements have been directly wrought. Fig. 3 is a sectional detail view showing the means provided by me for holding the sliding clutch part when out in the proper position to be moved in to engage the fixed part. Fig. 4 is a plan view, partially in section, of parts shown in Fig. 2.

In the drawings, $a$ designates the tin-cylinder shaft or shaft for operating the band-cylinder, upon which turns loosely the gear $b$, which engages with the teeth of the gear $c$, connected with the winding-drum $d$.

$e$ designates what I term the "fixed clutch part," since said part is not longitudinally movable upon the shaft $a$, though it turns loosely thereon. This fixed clutch part may be integrally connected with the gear $b$.

$f$ designates the movable clutch part, which is adapted to be shifted on the shaft $a$ into and out of engagement with the clutch part $e$. The clutch part $f$ is provided with a groove $g$, in which a fork or traveler $h$, pivoted upon the outer end of an arm $i$ of an angle-lever $j$, fulcrumed at $k$, is adapted to travel.

$l$, Figs. 3 and 4, designates a collar or disk which is fixed upon the shaft $a$ between the clutch parts $e$ and $f$. The said collar or disk is provided in its periphery with notches $m$, into which project dogs $n$, which extend out from the inner face of the clutch part $f$. The dogs $n$ are smaller or narrower than the notches $m$, so as to allow the clutch part $f$ to be turned circumferentially upon the shaft $a$ to a limited extent. The dogs are also of sufficient length to allow the clutch part $f$ to be moved longitudinally on the shaft $a$ to a degree sufficient to disengage said clutch part from the clutch part $e$ without disengaging it from the collar or disk $l$, as will be understood by reference to Figs. 3 and 4 of the drawings.

$o$ designates a spring, one end of which is connected with the collar or disk $l$ and the other with one of the dogs $n$, the said spring being constructed and arranged to operate with a tendency to move the clutch part circumferentially upon the shaft $a$ and hold it in position when the clutch parts are separated, so that when they are moved if the teeth of one part should strike upon those of the other there may be sufficient backlash or circumferential movement in a direction contrary to that exerted by the stress of the spring to permit the teeth of one part to move into the space between the teeth of the other part without damage to the teeth.

It is to be noted that the ends of the spring $o$ are bent at right angles to the main or body portion, so that the angular portions of the spring may be inserted in holes formed, respectively, in the collar or disk $l$ and dog $n$ of the sliding clutch part, this construction being for the purpose of providing means whereby the clutch parts can be separated to the desired extent without disengaging the sliding part from the collar or disk $l$.

$p$ designates a chain connected at one end with the outer end of the arm $q$ of angular lever $j$ and at the other end with a pin $r$, secured upon an arm of an angular lever $s$, (see dotted lines, Fig. 1,) pivoted upon a rock-shaft $t$, which shaft is actuated by the follower-leg $u$, as will be readily understood by those skilled in the art, and which is fully set forth in the patent hereinbefore referred to.

$v$ designates an arm extending down from the arm $i$ of lever $j$, to the lower end of which is connected one end of a strong spring $w$, the other end of said spring being attached to the square $x$ of the carriage. This spring $w$ operates, as will be understood from inspection of the drawings, to move the lever $j$ when the latter is released by the slackening up of the chain $p$, so as to move the sliding clutch part $f$ into engagement with the clutch part $e$. When, however, the chain $p$ is drawn upon by connections between it and the follower-leg, as it will be when the latter is unlocked, the lever $j$ will be moved in a direction opposite to that exerted by the stress of the spring $w$ thereon and move the clutch part $f$ outward out of engagement with the clutch part $e$. After a stretch of yarn has been spun and the follower-leg moves to its winding position, it will, through the medium of its connections, act upon pin $r$ to move the the same in the direction of the arrow shown in close proximity to the chain $p$ in Figs. 2 and 4, so as to slacken up upon the said chain and permit the spring $w$ to act upon the lever $j$ and throw the clutches into engagement, so as to effect the commencement of the winding immediately upon or just prior to the carriage starting on its inward run. After the winding has been completed and the follower unlocks it will, through its connections, draw upon the chain $p$ in direction contrary to that indicated by the arrow and so move the lever $j$ back against the stress of spring $w$ and unlock the clutches, immediately stopping the winding.

It will be seen that during the building up of a series of cops in the machine and the movement of the follower-leg toward the pin $r$ and lever $j$ the chain $p$ will be slackened; but this will effect no movement of the lever $j$, since the spring $w$ will operate to still hold the clutches in locked position.

It is to be noted that a link-rod provided with connections such as would give the pin $r$ some play in the link-rod sufficient to leave the lever $j$ unaffected by approach of the follower-leg toward said lever as cops are gradually built up would be the full equivalent of the chain $p$, as shown and described herein.

It is obvious that other changes may be made in forming an arrangement of parts comprising my improvements without departing from the nature or spirit of the invention.

Having thus described the nature of my improvements and explained a way of making and using the same, I declare that what I claim is—

1. The combination, with the band-cylinder, the gear $b$, and clutch part $e$, of the sliding clutch part, means to move it, the collar or disk intermediate the two clutch parts, dogs on the sliding clutch part engaged by the collar to cause it to rotate therewith and yet have a limited circumferential motion upon the shaft independent of the collar, and a spring engaged with the sliding clutch part and collar and operating to hold the former in a given position with respect to the latter, as set forth.

2. The combination, with the follower-leg, the band-cylinder, the gear $b$, and clutch part $e$, of the sliding clutch part $f$, the lever engaging the latter, the spring engaged at one end with said lever and at the other end with the square of the carriage and operating upon arm of said lever to move the sliding clutch part into engagement with the clutch part $e$ and the chain connected with the opposite arm of said lever, and connections between the chain and follower-leg to move the lever and sliding clutch part in the opposite direction, as set forth.

In testimony whereof I have signed my name to this specification, in the presence of two subscribing witnesses, this 6th day of November, A. D. 1891.

CHARLES A. DAM.

Witnesses:
FREDERICK W. BARNES,
CHAS. H. RICKER.